United States Patent [19]

Arnold et al.

[11] 4,367,774

[45] Jan. 11, 1983

[54] METHOD AND APPARATUS FOR STRIPPING INSULATION OFF WIRE IN COIL WINDING MACHINES

[75] Inventors: Richard B. Arnold; Leo M. Schlaudroff, both of Fort Wayne, Ind.

[73] Assignee: General Electric Company, Fort Wayne, Ind.

[21] Appl. No.: 175,441

[22] Filed: Aug. 5, 1980

[51] Int. Cl.³ .................. H01F 41/05; H02K 15/04
[52] U.S. Cl. ........................... 140/1; 81/9.51; 140/92.2
[58] Field of Search .............. 140/1, 92.2, 92.1; 81/9.51

[56] References Cited

U.S. PATENT DOCUMENTS

| | | | |
|---|---|---|---|
| 1,831,115 | 11/1931 | Holmes | 81/9.51 |
| 2,929,083 | 3/1960 | Davis | 81/9.51 X |
| 2,934,982 | 5/1960 | Eubanks | 81/9.51 |
| 3,505,720 | 4/1970 | Heimbrock | 81/9.51 X |
| 3,578,034 | 5/1971 | Eminger | 140/1 |
| 3,962,780 | 6/1976 | Kindig | 29/628 X |
| 4,117,749 | 10/1978 | Economu | 81/9.5 R |
| 4,275,619 | 1/1981 | Shimizu | 140/1 X |

OTHER PUBLICATIONS

"Pre-Stripper for Uniform Coil Leads Model 1-K-7" Publication of the Eraser Co., Inc., Syracuse, New York.

*Primary Examiner*—Kenneth J. Ramsey
*Attorney, Agent, or Firm*—Ralph E. Krisher, Jr.

[57] ABSTRACT

Method and apparatus for stripping the insulation off wire being drawn from a wire supply along a feed path by means of the coil winding machine. The wire is drawn through a wire stripper device, which is preferably of the type which comprises a plurality of rotating blades that rotate about and engage the surface of the wire so as to cut the insulation therefrom. The stripper device is actuated by the turns counter of the winding machine at a very accurately predetermined point in the winding cycle so that the segment of wire which is stripped will be positioned within the wire cutter following completion of the coil winding cycle, at which point the wire is severed. This produces stripped wire ends for one of the leads of the coil just wound and for one of the leads of the coil which is to be next wound. The wire can be pulled through the stripper by the coil winding machine. Alternatively, the winding head or spindle of the winding machine is stopped during stripping and the wire is pulled through the stripper device either manually or by a mechanical puller or the stripper device is moved along the wire.

20 Claims, 12 Drawing Figures

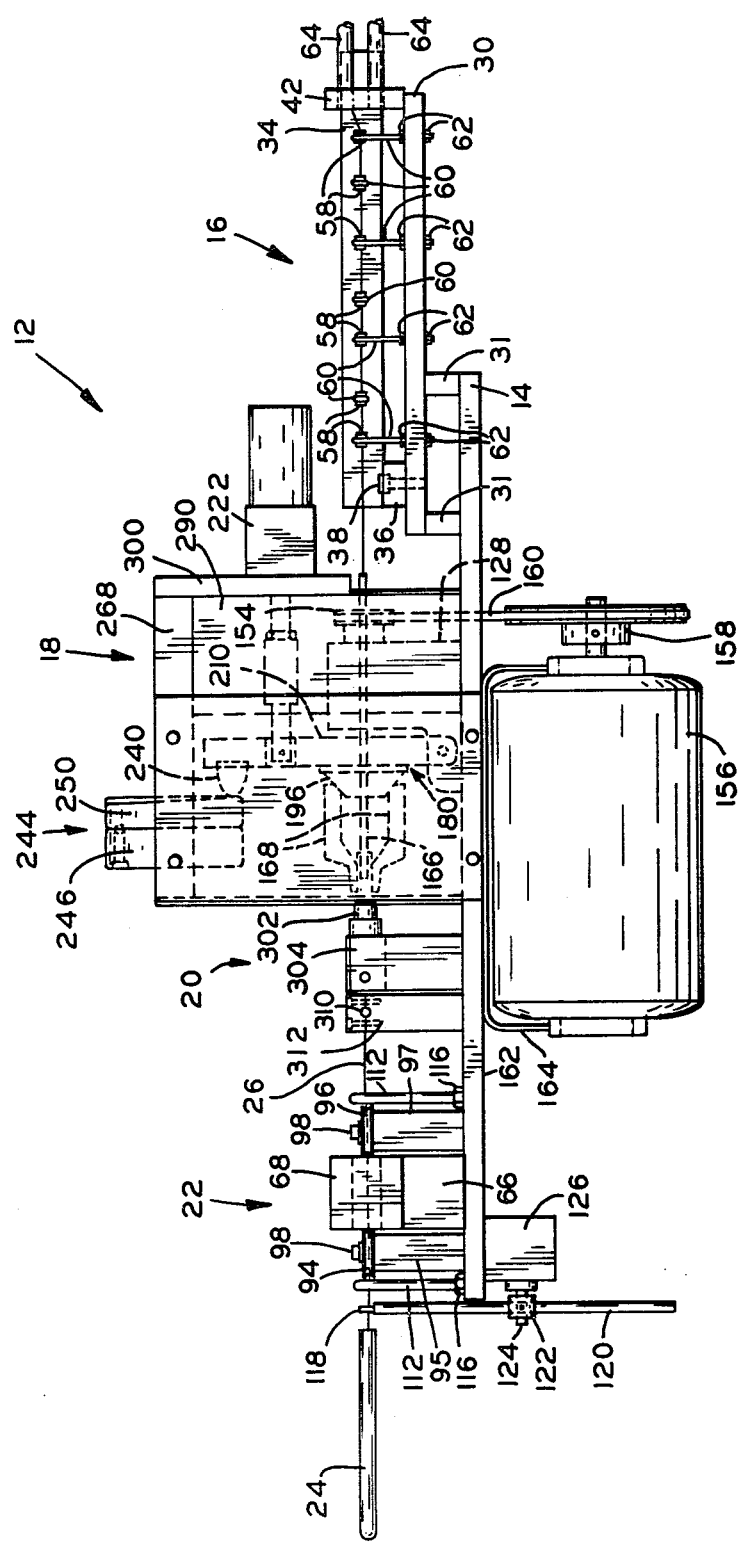

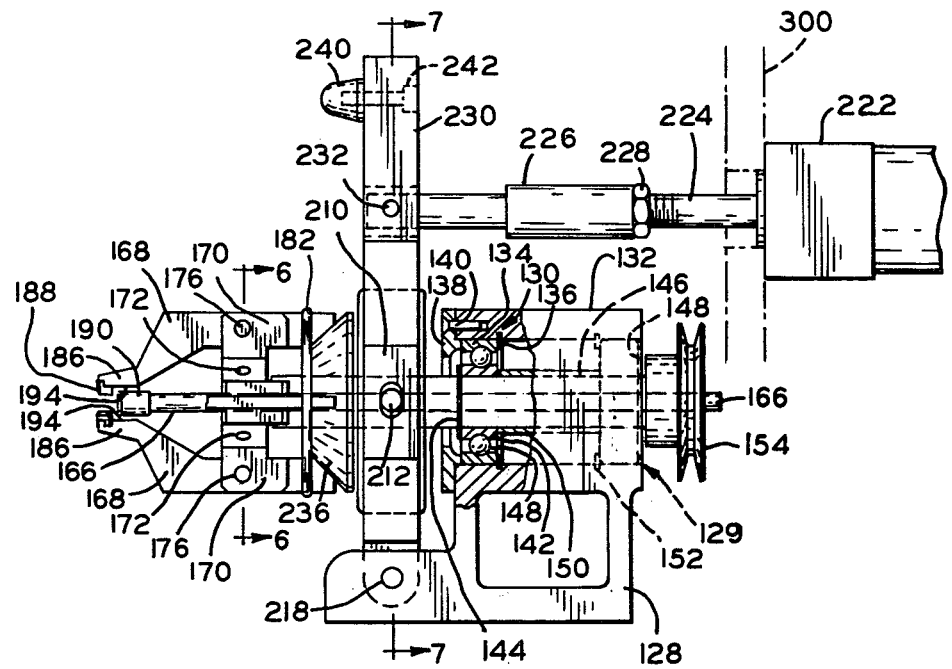
FIG. 3
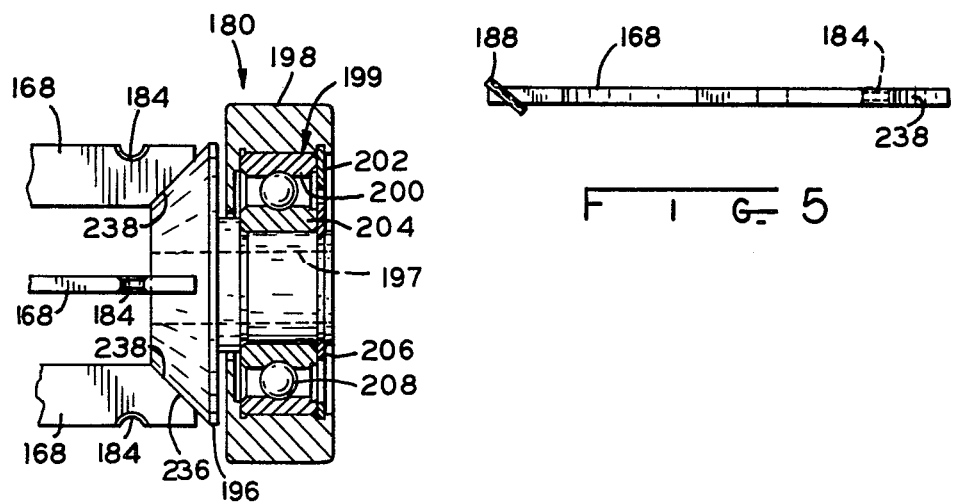
FIG. 4
FIG. 5

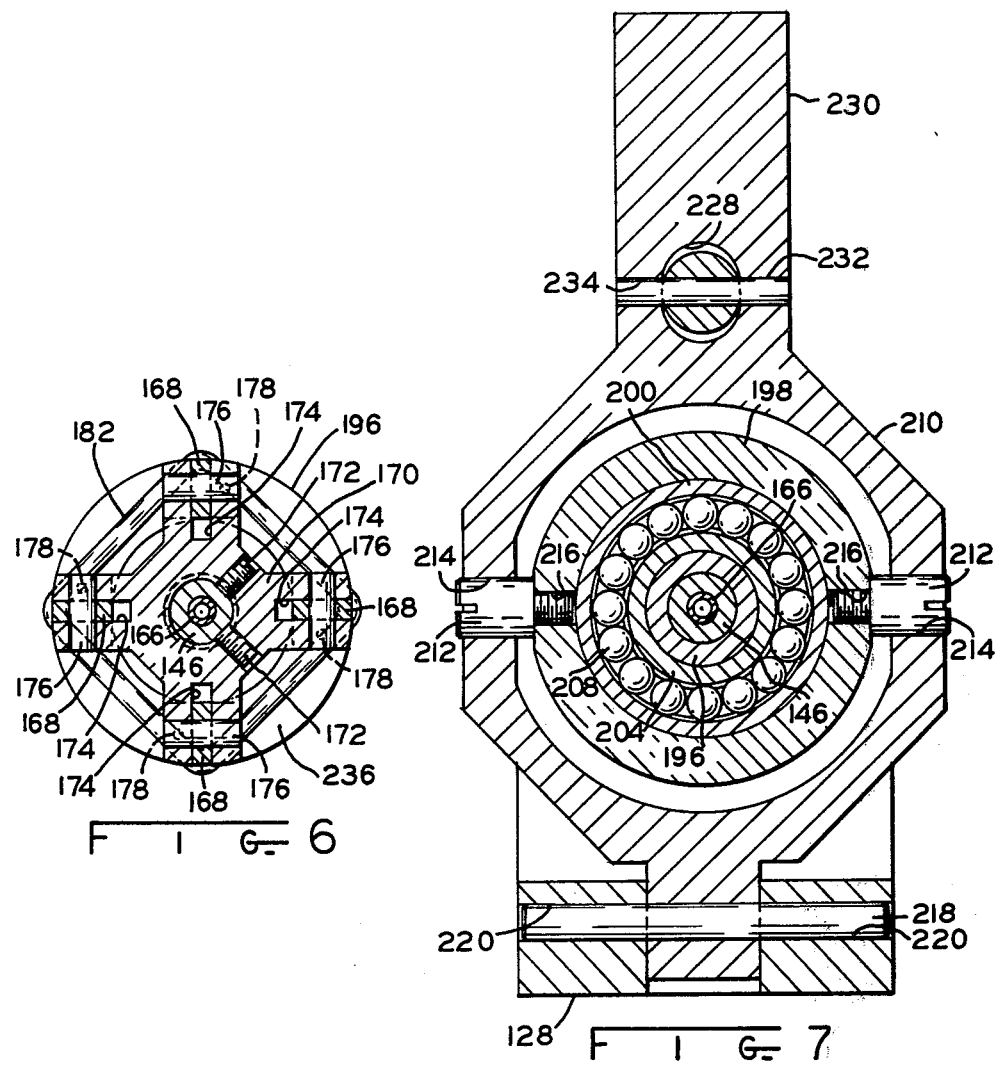
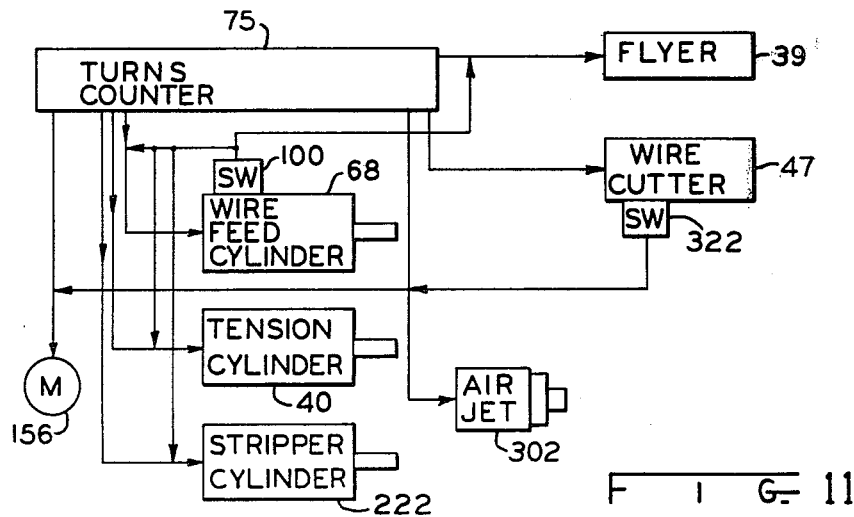

METHOD AND APPARATUS FOR STRIPPING INSULATION OFF WIRE IN COIL WINDING MACHINES

BACKGROUND OF THE INVENTION

The present invention relates to a method and apparatus for stripping the insulation from a segment of indeterminate length wire in connection with winding machines for forming stator coils.

In the manufacture of electric motors and other dynamoelectric machines, the excitation windings are usually made of magnet wire comprising a copper or aluminum core covered with a suitable layer of insulation, which may comprise a very thin coating of varnish or polyester resin. The wire is fed into the winding machine, formed into coils, as by the wind and shed technique, for example, and inserted into the slots of the stator core. Winding machinery of the wind and shed type is well known, and is described in the following exemplary U.S. patents, which are expressly incorporated herein by reference: Lauer et al. U.S. Pat. No. 3,977,444; Arnold et al. U.S. Pat. No. Re. 29,007; Cutler et al. U.S. Pat. No. 3,672,026; Arnold U.S. Pat. No. 3,672,027; Cutler et al. U.S. Pat. No. Re. 27,415; Smith U.S. Pat. No. 3,510,939; Lauer U.S. Pat. No. 3,765,080; Lauer U.S. Pat. No. 3,579,791; Smith U.S. Pat. No. 3,514,837; Arnold et al. U.S. Pat. No. 3,973,601; and Arnold U.S. Pat. No. 3,967,658.

During or after the winding process, the wire is cut at one or more places so as to produce a plurality of free ends. The wire ends are connected to a lead set, other motor windings, or terminal devices. Before the connections can be made, however, it is necessary to remove the insulation from the wire. One prior art technique for removing the insulation is that of brazing wherein the operators twist the wire ends around whatever they are to be connected and then heat them with a small torch, at the same time touching the heated wire and other wire or connection device with silver solder. The torch burns away the insulation, while at the same time melting the solder so that a good solder connection is established. As electric motor technology has become more sophisticated, however, insulation materials have been developed which can withstand much higher temperatures, even exceeding the temperature produced by the torch. As a result, the copper or aluminum core of the wire is melted before the insulation so that all that remains is a very fine tubular segment of insulation having no conductive material therein. Obviously, this prevents the establishment of electrical conduction between the wire and the connection device.

Another prior art technique for making electrical connections to the wire ends is to utilize crimp connection devices, which pierce the insulation and make contact with the conductive core of the wire. Examples of this technique are disclosed in U.S. Pat. Nos. 3,505,720 (Heimbrock) and 3,962,780 (Kindig). There have been substantial problems of reliability with crimp connection devices, however, particularly in demanding applications wherein it is necessary for the connections to maintain very good conductivity over a long period of time.

In order to avoid the reliability problems of crimp connection devices, it has often become necessary to use mechanical, hand-operated insulation strippers which strip off the insulation by scraping or cutting action. One such device is disclosed in U.S. Pat. No. 4,117,749 (Economu). It is also known to use small, hand-held strippers wherein a plurality of rotating blades driven by, for example, a pneumatic motor, spin around the wire and cut the insulation from a segment thereof. In this case, the operator manually feeds the free end of a coil lead into the rotating blades, which pivot inwardly and engage the enamel on the wire. Then, as the operator withdraws the end of the wire from the rotating blades, the insulation is cut and removed therefrom. This technique, although suitable for larger diameter wires, does not perform satisfactorily with fine wire, for example, wire finer than 0.025 inch in diameter. Furthermore, this technique does not lend itself to automation, and requires a certain amount of machine down time as the operator locates, inserts and then withdraws the cut ends of the coils.

A more automatic version of the rotating blade stripper is manufactured by The Eraser Company, Inc., of Syracuse, N.Y. In this apparatus, the wire is fed through the center of the machine and advanced through the center of the rotating stripper blades by means of an automatic clamp device which grips the wire and moves it a predetermined distance. The cutter blades are mounted on individual axes and caused to rock inwardly by means of a cam-like thrust block which is rotating in synchronism with the blades and is pressed axially against complementary cam surfaces on the blades so as to cause them to pivot inwardly. The depth of cut is controlled by adjusting the axial distance through which the thrust block is moved by a pneumatic piston and cylinder.

It is a general object of the present invention to provide a method and apparatus wherein insulated magnet wire being fed to a coil winding machine has the enamel insulation effectively stripped therefrom along a desired segment of the wire.

It is another object of the present invention to provide a method and apparatus for stripping wire which is being supplied to a coil winding machine whereby the length and position of the segment of wire which is stripped is automatically controlled so that the stripped segment will be positioned within the wire cutter at the conclusion of the winding cycle.

It is yet another object of the present invention to provide an apparatus for stripping wire which can easily be incorporated into the wire feed paths of existing coil winding machines.

It is a further object of the present invention to provide a method and apparatus for stripping the insulation off wire by means of rotating blades wherein the wire is tensioned and maintained in the center of the blades so as to avoid breaking and deforming the wire.

A still further object of the present invention is to provide a method and apparatus for stripping wire being fed to a coil winding machine wherein the wire is pulled through a stripper device by the winding head without the necessity for additional apparatus and without the necessity for intervention by the machine operator.

SUMMARY OF THE INVENTION

In carrying out the above and other objects and advantages of the invention, in one preferred form thereof, there is provided a method of stripping insulation from wire which is being fed to a coil winding machine or other apparatus wherein stripping of a segment of wire is desired. The wire is first fed through a tensioning device, and from there through a plurality of blades which are arranged in a circular array and positioned around the wire. The blades rotate about an axis coincident with the wire and are caused to move radially inwardly against the surface of the wire so as to cut insulation therefrom. The wire is pulled through the blades against the tension of the wire established, in part, by the tensioning device, which is located in the wire travel path on the opposite side of the rotating blades. The tensioning device serves to tension the wire during winding and to maintain the travel path of the wire straight so that it will not deviate from the center of the blades as they move inwardly and begin cutting off the insulation.

The wire feed path is continuous from the wire supply, through the wire stripper, and to the winding machine. This increases the efficiency of the winding process by eliminating the necessity for rethreading the wire each time a cut is made. Moreover, it is not necessary for the operator to manually insert a free end of the wire into a stripper at the beginning and completion of the winding of each coil set. The stripped ends of the wires for each coil set are formed by stripping an intermediate segment of wire before it reaches the winding machine, and then continuing to wind the wire around the coil form or spindle until the center of the stripped segment of wire is positioned within the wire cutter. When the wire is cut, two stripped ends will be formed, one for the coil just wound and the other for the coil which is to be wound next.

The wire can be drawn through the stripper by means of the winding machine itself. For example, the flyer is caused to continue to rotate, although preferably at a slower speed than during normal winding, and the stripper device is engaged for a predetermined period of time and after a precisely determined number of turns of the flyer. This stripped segment then travels along the feed path and arrives at the wire cutter just at the conclusion of the winding cycle.

Alternatively, the flyer or spindle is stopped after a precisely predetermined number of turns, the stripper is actuated and the wire is pulled through the stripper either manually or by a suitable mechanical apparatus, such as that disclosed in detail herein and which is the subject matter of copending application Ser. No. 175,442, filed Aug. 5, 1980. The winding head or spindle is then restarted and the stripped segment is drawn into the winding machine and stopped within the wire cutter as in the embodiment previously described. In this latter case, the length of the stripped segment is determined directly and is not dependent on the amount of time the stripper is actuated.

A third alternative for stripping a segment of the wire is to stop the winding machine so that the wire is stationary and then move the stripper along the wire. This could be accomplished by means of a hydraulic or pneumatic cylinder wherein the traverse length of the cylinder is adjustable.

The method for stripping insulation off wire in a coil winding process according to the present invention comprises: continuously drawing insulated wire along a wire feed path from a wire supply and developing a plurality of coils of wire in a coil winding machine by winding the wire around a coil form, providing a wire stripper device in the feed path between the wire supply and the winding machine so that the wire is continuously drawn through the stripper device, actuating the stripper device so that the stripper device strips the insulation off a segment of the wire as it is drawn through the stripper device, continuing to wind the wire around the coil form until the segment of wire which has been stripped is located in a wire cutter, and then actuating the wire cutter to sever the wire at a point within the stripped segment.

The apparatus according to the present invention comprises a supply of insulated wire, a winding mechanism for drawing wire from the supply and winding the wire around a coil form, and a wire stripper device positioned between the wire supply and the winding mechanism such that the wire passes through the stripper as it is drawn by the winding mechanism. The stripper is actuatable for selectively stripping the insulation off a segment of the wire, and the winding mechanism includes a wire cutter positioned to selectively engage and cut the wire at the stripped segment. Control means are provided for actuating the stripper to strip a segment of wire when a first predetermined length of wire has been wound, and for stopping the winding of the wire when a second predetermined length of wire, greater than the first predetermined length, has been wound. The first and second predetermined lengths differ by substantially the length of wire between the stripper device and the wire cutter.

The method and apparatus can be utilized in conjunction with conventional winding equipment of various types, such as wind and shed type winders. The following U.S. patents, which are owned by the assignee of the present application, are examples of such apparatus: Lauer et al. U.S. Pat. No. 3,977,444; Arnold et al. U.S. Pat. No. Re. 29,007; Cutler et al. U.S. Pat. No. 3,672,026; Arnold U.S. Pat. No. 3,672,027; Cutler et al. U.S. Pat. No. Re. 27,415; Smith U.S. Pat. No. 3,510,939; Lauer U.S. Pat. No. 3,765,080; Lauer U.S. Pat. No. 3,579,791; Smith U.S. Pat. No. 3,514,837; Arnold et al. U.S. Pat. No. 3,973,601; and Arnold U.S. Pat. No. 3,967,658. Furthermore, the method and apparatus could be carried out in conjunction with coil transfer winding equipment, such as that disclosed in Schlaudroff U.S. Pat. No. 3,831,641, and with in-slot winding equipment such as that disclosed in Mason U.S. Pat. No. 3,903,593. All of the above patents are expressly incorporated herein by reference.

FIGS. 2A through 11 illustrate an apparatus which is suitable for practicing the method according to the present invention. This apparatus is the subject matter of the aforementioned copending application Ser. No. 175,442, filed Aug. 5, 1982 of Philip G. Rodenbeck which is incorporated herein by reference. This apparatus comprises a support frame on which is mounted a blade assembly, a tensioning device on the upstream side of the blade assembly, and a puller device on the downstream side thereof. The tensioning device, blade assembly and puller device together define a wire travel path along which the wire travels as it is being fed to the coil winding machine.

The blade assembly of this apparatus comprises a plurality of blades arranged in a circular array around the wire travel path, and wherein each of the blades is pivotally mounted about an individual axis for radial inward rocking motion toward the wire travel path. The blades are rotated about the wire travel path and are caused to rock inwardly by means of a thrust block which is also rotating and in synchronism with the blades. The thrust block includes a cam face which engages complementary cam surfaces on the blades, and as the thrust block is urged against the blades by means of a pneumatic or hydraulic piston and cylinder, the blades rock inwardly so that their cutting tips engage the surface of the wire and cut the insulation therefrom as the wire is pulled through the blades. The depth of cut is controlled by limiting the degree of axial movement of the thrust block, which is achieved by means of a cam follower that engages the contoured face of an adjustable cam wheel that is adjustably mounted.

The wire is pulled through the rotating blades by means of a pulley arrangement wherein one of the pulleys is moved laterally against the wire so as to form an open loop therein. The length of the wire which is pulled through the blades and the speed at which it is pulled is controlled by controlling the speed at which and the distance through which the pulley is moved. In order to constrain the wire to move in a straight path through the rotating blades and to remain at the exact center of the blades, the wire is tensioned at a point upstream of the blades by the aforementioned tensioning device. During normal feeding of the wire through the apparatus to the coil winding machine, the tensioning device may be relaxed.

A blast of air is directed against the rotating blades as they are cutting the insulation off the wire so as to assist in removing particles of insulation and keeping the blades clean. The wire then passes over or through a brush which is for the purpose of loosening large particles of insulation which were not previously removed.

BRIEF DESCRIPTION OF THE DRAWINGS

The subject matter which we regard as our invention is particularly pointed out and described in the concluding portion of the specification. My invention itself, however, both as to its organization and method of operation, together with further objects and advantages thereof, may best be understood by reference to the following description taken in connection with the accompanying drawings wherein:

FIG. 2B is a side elevational view thereof;

FIG. 3 is an enlarged, elevational view, partially in section, of the blade assembly;

FIG. 4 is an enlarged, partially sectional view of the thrust block assembly and blades;

FIG. 5 is an enlarged elevational view of one of the blades;

FIG. 6 is an enlarged sectional view taken along line 6—6 of FIG. 3 and viewed in the direction of the arrows;

FIG. 7 is an enlarged sectional view taken along line 7—7 of FIG. 3 and viewed in the direction of the arrows;

FIG. 11 is a functional block diagram of the control arrangement for the stripper apparatus of FIGS. 2A through 10.

DESCRIPTION OF THE PREFERRED EMBODIMENTS

Figure 1:
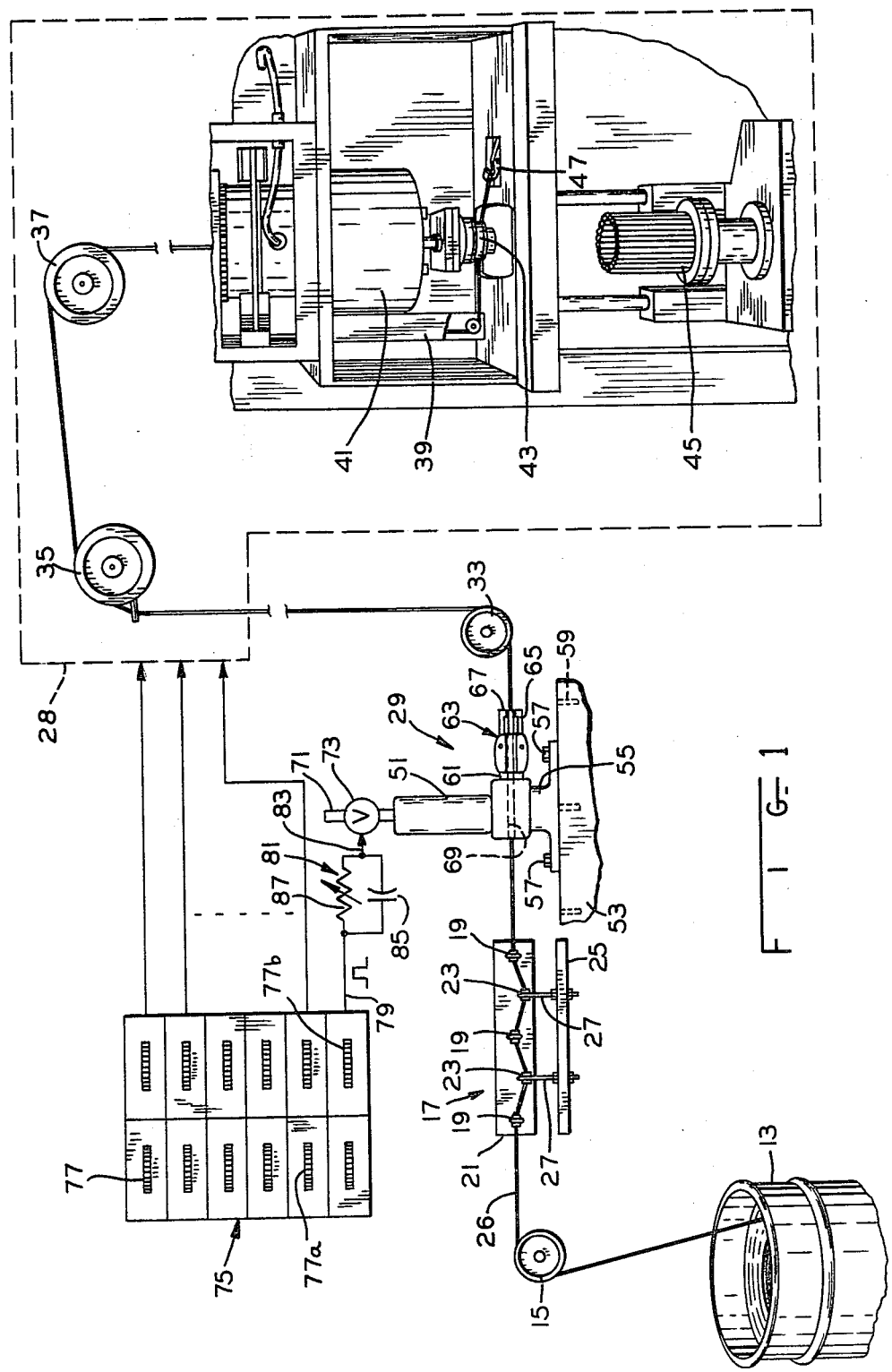
FIG. 1 is a diagrammatic view illustrating the arrangement of a wire stripper in connection with a source of wire supply and a wind and shed winder in accordance with the present invention.

With reference to FIG. 1 of the drawings, the overall arrangement of the apparatus according to the present invention is illustrated. Wire 26, which typically comprises a copper or aluminum core having a thin outer layer of enamel or other suitable insulation is fed from a drum 13 around pulley 15 and through tensioning device 17. Tensioning device 17, which is of well-known design, comprises a plurality of eyelets 19 connected to plate 21 and a second plurality of eyelets 23 connected to another plate 25 by rods 27. Wire 26 passes through eyelets 19 and 23, and when plates 21 and 25 are moved relative to each other, eyelets 19 distort the wire path as shown in FIG. 1.

From tensioning device 17, wire 26 passes through wire stripper 29 and around pulley 33 to coil winder 28, which, in the embodiment illustrated, is of the wind and shed type. Winding machine 28, only a portion of which is illustrated, may be of any conventional type such as one of those described in the aforementioned U.S. patents. Furthermore, the present invention is not limited to wind and shed machines, but could be used in conjunction with other types of coil winding machinery. Wire 26 passes around pulleys 35 and 37 and down into flyer 39, which rotates with drum 41 about a vertical axis so as to wind turns of wire around coil form 43. As the coils are developed, they drop into coil transfer and injection tool 45 for subsequent injection into the slots of the stator core (not shown).

In order to hold and cut the wire 26 at preselected points in the winding cycle, a wire cutter and holder 47 is provided. Such a cutter 47 is well known in the art, and for this reason, a detailed described thereof will not be undertaken. One suitable cutter is disclosed in the aforementioned U.S. Pat. No. 3,673,027 and comprises a hook which engages the wire at a selected point in the winding cycle. The hook includes a cutting edge so that when the hook engages the cutting block, the cutting edge will shear the wire thereby forming a free end on the coil just wound. The cutter and holder 47 also holds the wire for winding of the next coil.

The wire stripper 29 illustrated in FIG. 1 and described hereinafter is merely exemplary and the present invention is not limited, in its broadest aspects, to the particular form of stripper 29 nor to the alternative stripper apparatus shown in FIGS. 2A through 11.

For purposes of the diagrammatic illustration of the invention of FIG. 1, stripper 29 comprises a Dotco 2,000 rpm right angle drive pneumatic motor unit 51, which is secured to support 53 by bracket 55 and screws 57. Additional appropriately spaced tapped sockets 59 are provided on support 53 so that the position of stripper 29 relative to winding machine 28 can be adjusted. Connected to the spindle 61 of motor unit 51 is a conventional blade assembly 63, which comprises four blades 65 that are pivotally mounted and weighted such that, when they are rotated by spindle 61, they will pivot inwardly about their respective pivots so as to cause their cutting tips 67 to move inwardly and engage the surface of wire 26.

The spindle of motor unit 51 has been drilled out to form an axial bore 69 through which wire 26 extends. With the blades rotating and in engagement with wire 26, as wire 26 is pulled past the cutting tips 67, the insulation will be stripped therefrom. Blade assembly 63 may be of any suitable type, such as Model MXOW- KG1 sold by Jenson Tools and Alloys, Inc. of Phoenix, Ariz. Motor unit 51 is powered by pneumatic pressure from line 71 having a solenoid controlled valve 73 therein.

In a manner well known in the art, winding machine 28 is controlled by turns counter 75, which may be of any suitable design, such as one of the counters manufactured by the Dynapar Co. Turns counter 75 counts the number of turns of flyer 39 to a precision of 1/100 turn, and can be programmed to start, stop, speed up or slow down flyer 39. This is accomplished by setting the proper turns values into the appropriate dials 77, and when the counter 75 detects that the flyer 39 has undergone the number of turns which has been set in by the corresponding dial, the flyer 39 is caused to act in accordance with the programmed step. For example, assume that the portion of the circuitry of turns counter 75 controlled by dial 77a is programmed to slow down the flyer 39 in preparation for its final turn at the end of the winding cycle. When the turns count set into dial 77a is detected by turns counter 75, an electrical signal will be transmitted to the control circuitry of winding machine 28 causing flyer 39 to begin rotating at a slower speed. Other commands such as jumping the coil form 43, stopping the flyer 39, accelerating the flyer 39 etc. are generated in a similar fashion by setting the desired counts for these turns on respective dials 77. Although turns counter 75 is illustrated schematically as being removed from winding machine 28, in practice, it is actually a part of machine 28 itself. Turns counter 75 is shown as having twelve dials 77 so that twelve different commands can be generated at selected points in the winding cycle. However, turns counters having more or less than twelve dials can also be used.

In order to cause stripper 29 to begin stripping at the proper time in the winding cycle, an appropriate connection is made to turns counter 75 by wire 79 so that an electrical pulse will be developed on line 79 at the revolution of flyer 39 set into turns counter 75 by dial 77b. Since this signal is a relatively short duration pulse, a simple RC time delay circuit 81 is connected between line 79 and line 83, which is connected to the solenoid (not shown) operating valve 73. Time delay circuit 81, which comprises parallel connected capacitor 85 and variable resistor 87, causes the pulse generated by turns counter 75 to undergo a slow decay as shown schematically. This causes the solenoid opening valve 73 to remain activated until the voltage level on line 83 falls below the threshold of the solenoid. Other suitable time delay or pulse stretching circuits could be employed.

During the time that the solenoid is activated, valve 73 will be open thereby admitting pneumatic pressure to motor unit 51. This rotates the spindle 61 and causes blades 63 to engage and strip the insulation off wire 26 as it is being pulled therethrough. When the solenoid is deactivated, valve 73 will close thereby terminating the flow of air to motor unit 51 so that blades 63 will cease rotating. A spring return or other suitable means will cause blades 63 to open thereby disengaging wire 26. The count set into turns counter 75 by dial 77b is carefully selected so that approximately the center of the stripped segment of wire will be disposed within the shearing edges of wire cutter 47 at the end of the winding cycle. When the wire 26 is cut, two free ends which have been stripped of insulation will result, one on the coil just wound and the other at the end of the wire which will be wound into the next coil.

Wire 26 is fed from drum 13, around pulley 15, threaded through tensioning device 17, through the axial bore 69 of stripper 29, around pulleys 33, 35 and 37, and flyer 39. With the end of wire 26 engaged by wire cutter and holder 47, flyer 39 begins to rotate so as to wind the wire 26 around the lowest step of coil form 43. When a particular count has been detected by turns counter 75, as set therein by one of the dials 77, coil form 43 jumps downwardly so that the wire is then wound around the next larger step. This process continues until the coil form 43 is jumped to its lowest position and the final coil is wound.

In one method according to the present invention, turns counter 75 transmits an electrical pulse to stripper 29 at a very precisely determined count prior to the last count of flyer 39 in developing the final coil. This count is determined by computing the linear distance along the wire travel path between the cutting tips 67 of blades 63 and the point in the circular path of wire from flyer 39 where it is engaged by wire cutter and holder 47. Since the circumference of the coils formed on the last step of coil form 43 are known, the number of turns prior to the completion of the last turn where the wire is engaged by wire cutter 47 can be determined very precisely, and it is the final turn count minus this number of turns which is set into dial 77b.

Thus, when the turns count set into dial 77b is detected by turns counter 75, the electrical pulse from turns counter 75 on wire 79 will be delayed or stretched by RC circuit 81 and transmitted to the solenoid controlled valve 73. This will admit pressurized air to pneumatic motor unit 51 so as to cause blade assembly 65 to rotate, engage the wire and strip the insulation therefrom for a period of time equal to the time that the voltage from RC circuit 81 is above the operative threshold of the solenoid controlling valve 73. At the end of this time interval, solenoid valve 73 will close thereby stopping blade assembly 65, and the stripped segment of wire 26, which is determined by the linear speed of wire 26 and the time which blade assembly 65 is in engagement with wire 26, will travel toward flyer 39. Assuming that the proper strip count has been entered into dial 77b, when turns counter 75 transmits the signal causing flyer 39 to stop at the end of the coil winding cycle, approximately the center of the stripped segment will be positioned exactly within the shearing edges of wire cutter and holder 47. Although very high rotational speeds of blade assembly 65 are necessary, it is possible to strip the segment of wire by drawing it through stripper 29 at the normal operating speed of flyer 39 without slowing it down. A preferred method, however, is to slow the flyer down so that it is rotating at a lower speed, thereby resulting in a lower linear speed for wire 26, during the strip sequence. To accomplish this, turns counter 75 has one of its dials 77 dedicated to decelerating flyer 39 just prior to the strip count. As flyer 39 develops the turns of the final coil, when the flyer slowdown count is detected by counter 75, flyer 39 will be caused to slow down and rotate at a much lower speed. At a subsequent count, which is set into counter 75 by dial 77b, stripper 29 will be activated and strip a segment of wire 26, the length of which is determined by the effective width of the pulse from time delay circuit 81. Since the linear speed of wire 26 is much lower, the variable resistor 87 will be adjusted so as to provide a much wider pulse. Following stripping of the segment, counter 75 could be programmed to cause flyer arm 39 to accelerate and rotate at a higher speed until the final count. Alternatively, flyer 39 could continue to rotate at the lower speed, since the stripped segment will be quite close to the end of the coil winding cycle. As was the case with the first method described, the count at which the stripper 29 is activated is selected such that the stripped segment will be positioned within the shearing blades of wire cutter and holder 47 when flyer 39 stops at the end of the winding cycle.

Since relatively high speeds of rotation for blade assembly 65 are necessary to ensure that all of the insulation is removed from the strip of wire in the stripped segment, it has been found advantageous in many cases to pull the wire 26 through the stripper 29 independently of the flyer 39. In this case, counter 75 is programmed to stop flyer 39 at the predetermined strip count, and at the same count activate stripper 29 to begin rotating and stripping the insulation off wire 26. Wire 26 is then pulled either manually or by a mechanical device, such as that to be described below, through stripper 29 so that the insulation is stripped off a segment of wire 26 having the desired length. Stripper 29 could either be activated manually or by turns counter 75 as in the case of the two previous methods. After the segment has been stripped, flyer 39 is again started, and the final turns of the last coil are wound. At the termination of winding, the stripped segment will be positioned within the shearing blades of wire cutter and holder 47.

In order to maintain wire 26 within the center of blades 63, it is tensioned by means of tensioning device 17. Tensioning device 17 can be actuated, either continuously during the winding cycle, or only during the strip sequence, whichever produces the best results depending on the particular apparatus used and wire being wound.

In the third alternative method discussed above, wire 26 could be pulled through stripper 29 by means of a mechanical apparatus after flyer 39 has stopped. For the sake of completeness, a preferred apparatus for accomplishing this will be described, although the apparatus itself is the subject matter of the aforementioned copending application Ser. No. 175,442. The apparatus to be described is actuated by a turns counter and replaces tensioning device 17 and stripper 29.

Figure 2A:
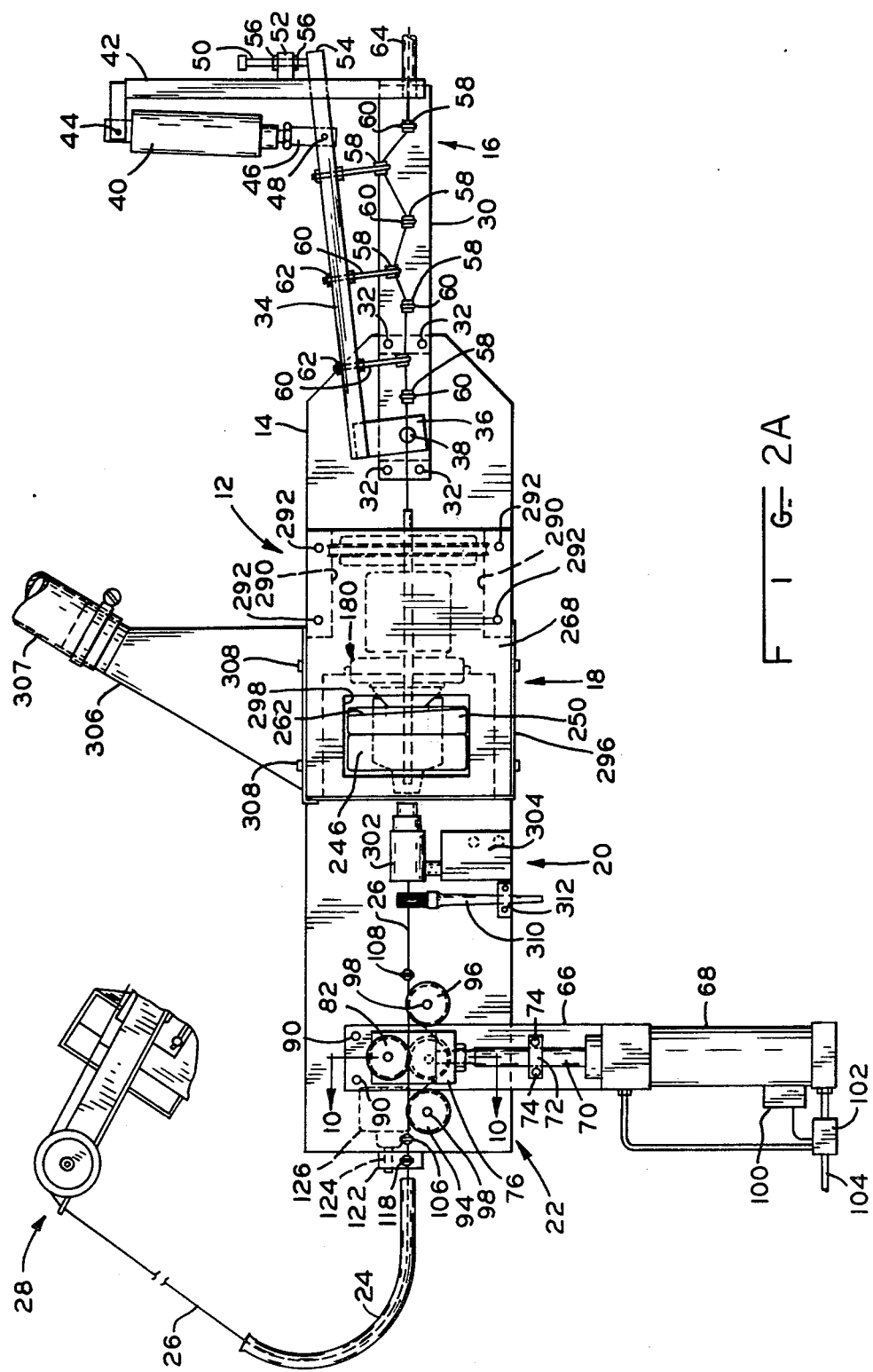
FIG. 2A is a plan view of an alternative wire stripper apparatus suitable for carrying out the invention shown diagrammatically in FIG. 1.

With reference now to FIGS. 2A through 11, and in particular FIGS. 2A and 2B, the overall arrangement of a wire stripper apparatus 12 suitable for use in the present invention is illustrated. It comprises a base plate 14 to which is attached a tensioning device 16, a blade assembly 18, a particle removal system 20 and a wire pulling device 22. Supported at the discharge end of the apparatus 12 is a wire guide tube 24, which guides the wire 26 to the coil winding apparatus 28, a portion of which is illustrated in FIG. 2A. As discussed in the preliminary portion of the specification, coil winding machine 28 may be any one of a variety of prior art machines, such as those described in the aforementioned patents relating to wind and shed machines.

Wire tensioning device 16 comprises a base plate 30, which is rigidly fastened to base plate 14 by spacer blocks 31 and screws 32. Movable arm 34 is connected to base plate 30 through pivot block 36, the latter being pivotally connected to base plate 30 by shoulder bolt 38. Arm 34 is actuated by means of a pneumatic piston and cylinder 40, which is pivotally connected to bracket 42 by pivot pin 44 and to arm 34 through the piston connecting rod 46 and pivot pin 48. Bracket 42 is welded, bolted or otherwise secured to base plate 30. An adjustable stop 50 extends through an opening in bracket 52, and its axial position with respect to the end 54 of arm 34 can be adjusted by appropriately positioning lock nuts 56. When pneumatic cylinder 40 is actuated so as to pull arm 34 away from base plate 30 in a horizontal plane, the end 54 of arm 34 will engage the end of stop 50. Pneumatic cylinder 40 is connected to a suitable source of pneumatic pressure (not shown).

The wire 26 is guided through tensioning device 16 by means of a plurality of carbide eyelets 58 connected to base plate 30 by rods 60, the latter secured to base plate 30 by nuts 62. The wire 26 is also guided by a second set of carbide eyelets 58, which are connected to arm 34 by rods 60 and nuts 62. It will be appreciated that, when piston and cylinder 40 is actuated, the eyelets 58 connected to arm 34 will distort the wire path thereby increasing the frictional drag and the linear tension of the wire 26. Wire 26 is fed into tensioning device 16 through one of wire guide tubes 64.

Figure 10:
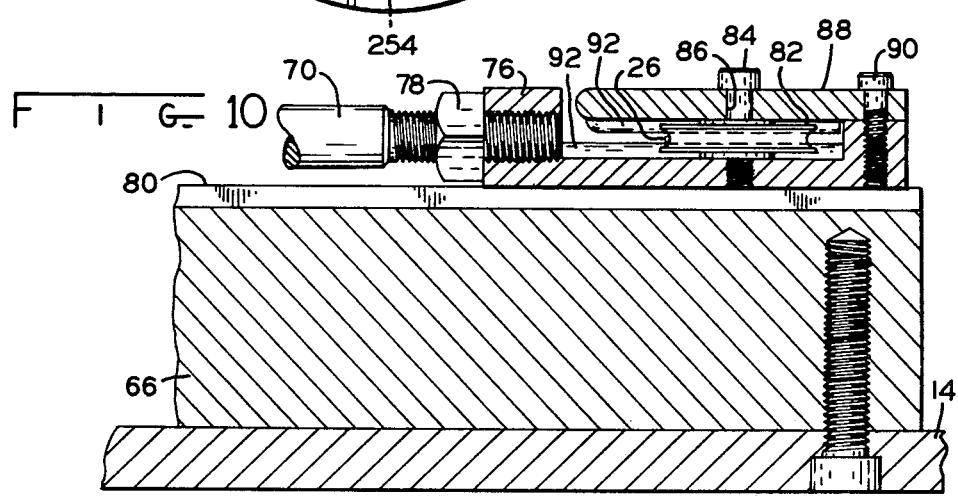
FIG. 10 is an enlarged sectional view taken along line 10—10 of FIG. 1 and viewed in the direction of the arrows.

With additional reference to FIG. 10, the wire pulling device 22 will now be described. It comprises a cylinder mounting plate 66, which is screwed to plate 14 and has a hydraulic cylinder 68 mounted thereto. Cylinder 68 may be any suitable commercially available hydraulic cylinder, such as a Tom Thumb HVB cylinder. Cylinder 68 includes a connecting rod 70, to which split collar 72 is connected by screws 74. The end of connecting rod 70 is threadedly secured to pulley mounting plate 76 and, because of the threaded connection, adjustment of the position of pulley mounting plate 76 relative to connecting rod 70 can be made. Lock nut 78 prevents connecting rod 70 from turning once the desired adjustment has been obtained. Pulley mounting plate 76 slides on the upper surface 80 of cylinder mounting plate 66, as best shown in FIG. 10. A pulley 82 is connected to mounting plate 76 by screw 84, which passes through an opening 86 in pulley retainer 88 and is threadedly secured to pulley mounting plate 76. Pulley retainer 88 is rigidly connected to pulley mounting plate 76 by screws 90. In order to prevent the wire 26 from becoming nicked or damaged by coming into contact with sharp edges, pulley mounting plate 76 and pulley retainer 88 are provided with rounded beads 92, which are soldered thereto. Beads 92 are provided both on the leading and trailing edges of retainer 88 and support plate 76.

A pair of additional pulleys 94 and 96 are pivotally secured to plate 14 by posts 95 and 97 and screws 98 about which the pulleys 94, 96 rotate. Pulleys 82, 94 and 96 are positioned such that the wire 26 passes in a substantially straight line from the blade assembly 18 to wire guide tube 24. When hydraulic cylinder 68 is actuated, however, connecting rod 70 will be retracted so as to pull pulley 82 against wire 26 thereby forming an open loop in wire 26 as shown in the dotted line position in FIG. 1. The extent to which connecting rod 70 will be retracted can be controlled by any one of a number of different techniques, such as adjusting rod 70, positioning collar 72 to contact cylinder 68, or by utilizing a magnetic switch 100 which senses the position of the piston within cylinder 68 and actuates the hydraulic control valve device 102 to shut off or reverse the hydraulic flow within cylinder 68. Magnet switch 100 may be of any commercially available type, such as a Tom Thumb No. AN10-6-04-2. Valve 102 is fed by hydraulic fluid from line 104.

Since the wire 26 is firmly engaged by the flyer 39 of the coil winding machine 28, it cannot be pulled rearwardly as pulley 82 is retracted. Accordingly, the wire will be pulled from the supply 13 through the tensioning device 16 and blade assembly 18. The length of wire which is pulled through blade assembly 18 can be accurately determined by adjusting the position of magnetic switch 100 or collar 72, because the amount of wire pulled through is directly related to the size of the open loop formed as the wire is distorted from its normal travel path by pulley 82. The speed at which wire 26 is pulled through the blade assembly 18 can be controlled by adjusting hydraulic valve 102. This technique for pulling wire 26 through blade assembly 18 is advantageous in that the wire is contacted by rolling surfaces, as opposed to clamps and the like, as in the case of certain prior art apparatus.

In order to further ensure that the wire 26 passes through the exact center of the blades in blade assembly 18, additional eyelets 106 and 108 are provided, and are connected to plate 14 by rods 112 and nuts 116. The wire also passes through eyelet 118, which is mounted to the upper end of rod 120, the latter being secured to bracket 122. Bracket 122 is also connected to shaft 124, which is part of an Allen Bradley No. 802G-GP Series F limit switch. In the event wire 26 should break, rod 120 would be caused to deviate from its normal position thereby tripping limit switch 126, which will shut down the apparatus 12.

With additional reference now to FIGS. 3, 4, 5, 6, and 7, the blade assembly 18 will be described. Blade assembly 18 comprises a pedestal 128 (FIG. 3), which is screwed to base 14, and has bearings 129 and 130 mounted therein. Bearing 130 comprises an outer race 134 held in position by snap ring 136 and bearing cap 138, the latter secured to pedestal 128 by screws 140. The inner race 142 of bearing 130 is held in place by snap ring 144, which is received in a groove in shaft 146. A plurality of balls 148 are captured between inner race 142 and outer race 134. The other bearing 129 is held against the rear shoulder 148 of pedestal 128 by spacer 150, which is in abutment with the respective inner races of bearings 130 and 129. A snap ring 152 holds the outer race of bearing 129 in place.

A shaft 146 extends through the inner races of bearings 129 and 130 and has a pulley 154 drivingly connected to its rear end. An electric motor 156 (FIG. 2) drives pulley 154 through pulley 158 and belt 160. Motor 158 is secured to the underneath side 162 of base plate 14 by mounting bracket 164. A tube 166 extends through hollow shaft 148 and is press fit therein. Tube 166 extends completely through blade assembly 18 and serves as the guide for wire 26 as it is fed through the apparatus 12.

Referring now particularly to FIGS. 3, 4 and 6, blade assembly 18 comprises four blades 168, which are connected to shaft 146 by spider 170. Spider 170 is keyed to shaft 146 by set screws 172 (FIG. 6) and includes four slots 174 within which blades 168 are received. Blades 168 are pivotally connected to spider 170 by pivot pins 176, which, in turn, are held in place by set screws 178. This arrangement permits blades 168 to rock about pivots 176 when they are actuated by the thrust block 180 (FIG. 4); blades 168 are biased to their open, non-engaged positions by a resilient O-ring 182, which is received within cutouts 184. It will be appreciated that O-ring 182 is on the opposite side of the fulcrum points defined by pins 176 from the forward ends 186 of blades 168.

The forward ends 186 of blades 168 have sharpened, carbide cutting tips 188 brazed thereto. As shown in FIG. 5, cutting tips 188 are disposed at 45° angles relative to the centerline of blades 168 so that, when they are in engagement with the wire being drawn through blade assembly 18, they overlap somewhat so as to form a diamond-shaped opening which tends to center the wire as the insulation is being stripped therefrom. A cylindrical spacer 190 is received over the forward end of tube 166 and welded thereto. Spacer 190 is dimensioned such that it will be contacted by the inner edges 194 of blades 168 as they are rocked inwardly and allow a minimum of 0.010 inch between the cutting edges of carbide tips 188. The purpose of this is to prevent the blades from closing to too great an extent thereby damaging the tips 188. Tube 166 is preferably tapered inwardly on its inner surface just prior to the exit end thereof so as to confine the wire to the exact center of cutter tips 188 as it exits tube 166.

With particular reference to FIGS. 3, 4 and 7, it will be seen that thrust block 180 comprises a cone element 196 having a bore 197 within which shaft 146 is received. Cone element 196 is capable of rotation relative to outer ring 198 by virtue of bearing 199. Bearing 199 comprises an outer race 200 retained in place by snap ring 202, an inner race 204 retained in place by snap ring 206, and a plurality of balls 208 captured between inner race 204 and outer race 200.

Outer ring 198 is mounted to yoke 210 (FIG. 7) by hinge pins 212, which are loosely received within openings 214 in yoke 210 and are threaded into sockets 216 in outer ring 198. Yoke 210 is pivotally connected to pedestal 128 by dowel 218, which is press fit within openings 220 in pedestal 128.

Yoke 210 is pivoted back and forth on dowel 218 by air cylinder 222 (FIGS. 2 and 3), which includes a connecting rod 224 adjustably connected to pressure stud 226 by a threaded connection and locked in place by lock nut 228. Pressure stud 226 extends through an opening 228 in the upper portion 230 of yoke 210 and pivots on dowel 232, which is press fit in openings 234 in the upper portion 230 of yoke 210. As the piston (not shown) of air cylinder 222 is advanced, the above-described linkage will push yoke 210 forwardly, which, in turn, pushes thrust block 180 forwardly. Cone element 196 includes a frusto-conical cam surface 236, which engages complementary cam surfaces 238 on the rear ends of blades 168. As cone element 196 is pressed forwardly, it urges the rear ends of blades 168 radially outwardly, thereby causing blades 168 to rock about their respective pivots 176. This causes the forward ends 186 of blades 168 to rotate inwardly so as to bring the cutting tips 188 into contact with the surface of the wire 26 being drawn out the forward end of tube 166. When cylinder 222 retracts, thrust block 180 will be pulled rearwardly and the resilience of O-ring 182 will cause blades 168 to resume their initial positions thereby retracting cutting tips 188 away from wire 26.

Figure 8:
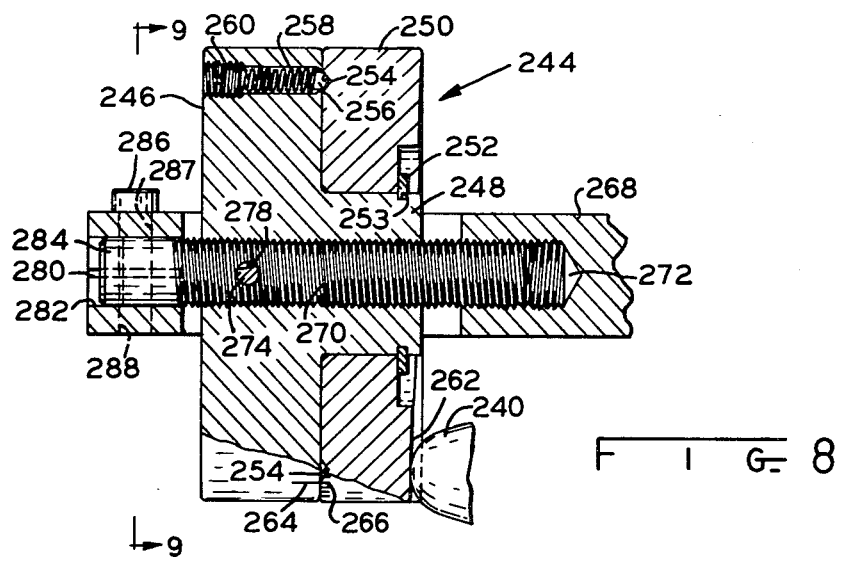
FIG. 8 is an enlarged sectional view, partially in elevation, of the cutting depth adjustment mechanism.
Figure 9:
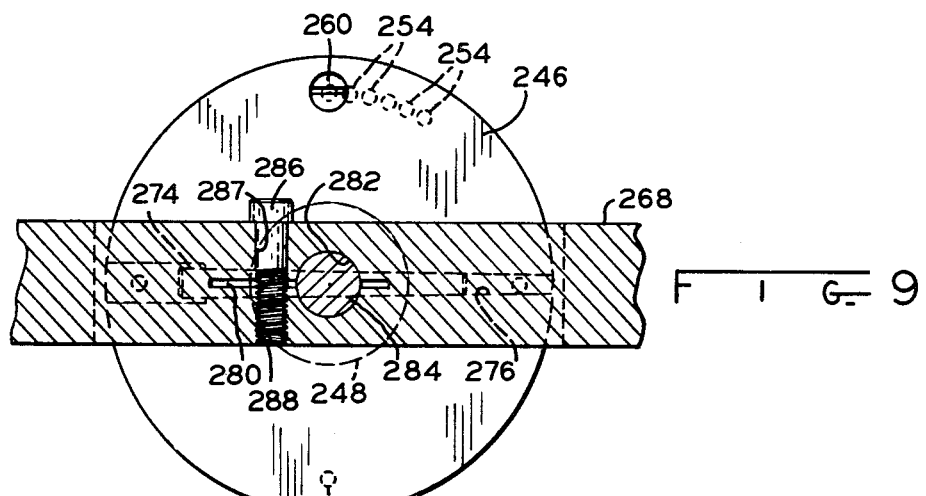
FIG. 9 is a front elevational view of the mechanism of FIG. 8.

The depth of cut is controlled by limiting the degree to which thrust block 180 is moved axially against blades 168. This is accomplished by means of a cam follower 240 connected to the upper portion 230 of yoke 210 by screw 242. FIGS. 8 and 9 show in detail an adjustable stop mechanism 244 which is engaged by the cam follower 240. Stop mechanism 244 comprises a ratchet wheel 246 having a shaft portion 248 on which is rotatably received a cam wheel 250. Cam wheel 250 is retained on ratchet wheel 246 by means of snap ring 252, which is received within an annular slot 253 in the shaft portion 248 of ratchet wheel 246. Cam wheel 250 includes a plurality of recesses 254 arranged in a circular array around the entire periphery of wheel 250. A ball 256 is urged into a selected one recess 254 by means of spring 258 held in place by recessed screw 260. This detent mechanism permits cam wheel 250 to be turned by increments as defined by the positions of recesses 254.

Cam wheel 250 includes a cam face 262, which is contoured such that, as wheel 250 is turned, the depth of cut presented to cam follower 240 will vary. As will be appreciated, the further that cam follower 240 is permitted to be pushed forwardly by air cylinder 222, the greater the distance that blades 168 will rotate inwardly. Ratchet wheel 246 has a scribe line 264 etched thereon, and cam wheel 250 has a plurality of scribe lines 266 etched thereon across from line 264, which are calibrated in terms of wire diameter. This enables cam wheel 250 to be turned to the proper setting for a given wire diameter and thickness of insulation so as to remove only the insulation without cutting into the conductive core of the wire.

Ratchet wheel 246 is secured to the upper plate 268 of blade assembly 18 by means of adjustment screw 270, which is threaded into socket 272 in upper plate 268. Ratchet wheel 246 is keyed to adjustment screw 270 by pin 274 (FIG. 9), which is received within a tapered hole 276 in wheel 246 and extends into hole 278 in screw 270. The forward end of top plate 268 is provided with a saw cut 280 extending from the opening 282 in which the head 284 of screw 270 is received. Cap screw 286 passes through an opening 287 above saw cut 280 and is threaded into socket 288 below saw cut 280. When screw 286 is tightened, the head 284 of screw 270 will be clamped in opening 282. If it is desired to recalibrate the stop mechanism 244, screw 286 is loosened and the entire assembly including wheels 246 and 250 and screw 270 is turned thereby adjusting the axial position of the assembly relative to top plate 268 and cam follower 240. When a desired position has been reached, screw 286 is again retightened so as to clamp screw 270 against further rotation.

The enclosure for blade assembly 18 comprises a pair of side plates 290 which are screwed to base plate 14, a top plate 268 connected to side plates 290 by screws 292, and guard 296 which is connected to top plate 268 and base 14. An opening 298 in top plate 268 accommodates the adjustable stop mechanism 244 described above. Air cylinder 222 is supported by cylinder mounting plate 300, which is secured to top plate 268 and side plates 290.

In order to assist in removing the particles of insulation stripped from wire 26 by blades 168, an air blast is directed against the cutting tips 188 of blades 168 and against wire 26 by means of a Vortec Model 901 air jet 302 (FIGS. 1 and 2) manufactured by Vortec Corporation. Air jet 302 has an opening completely through the center of it so as to permit the passage of wire 26, and develops an annular air stream which converges on wire 26 and blade tips 188. Air jet 302 is supported by mounting bracket 304 and supplied with pressurized air from a suitable source (not shown). The blast of air assists in removing particles from the wire as it is being stripped by blades 168, and these particles are drawn away by means of a vacuum system comprising chute 306 connected to top plate 268 and base 14 by screws 308. Since the side of blade assembly 18 to which chute 306 is attached is open, the loosened particles blown rearwardly by jet 302 will be drawn through chute 306 and hose 307 for collection and disposal.

A brush 310, which is supported by bracket 312 connected to base plate 14, is positioned within or just above or below the wire travel path, and serves to knock large, loosened particles off wire 26 which were not removed by the air blast from jet 302.

The stripper 12 may be used in combination with a coil winding machine 28 and tied into its sequencing operation by monitoring the turns counters on such machine. Of course, the particular manner of integrating the stripper 12 with the winding machine 28 will depend on the design of the winding machine and on the particular stator configuration which is being wound.

FIG. 11 illustrates in a very general, schematic fashion the functional relationship between the turns counter 75 of the winding machine 28, the flyer 39, wire cutter 47, wire feed cylinder 68, tension cylinder 40, stripper cylinder 222, motor 156 and air jet 302. Although turns counter 75 is shown as a single block, it may comprise a plurality of well known individual counters which may each be preset for a certain number of counts of the flyer 39.

The stripper 12 operates in the following manner. Initially, the turns counter 75 is set for the proper turn count on the last step of the coil form (not shown) in the wind and shed winding machine 28 prior to the point where stripping is desired. The stopping position of the flyer will determine the location of the stripped portion of wire, and the proper count can be determined by taking into consideration the location of the stripper 12 relative to the flyer, the diameter of the last coil to be wound, etc. For example, a setting of 1/100 on the counter 75 may equal a wire length of approximately ⅜ inches. The length of stripping is determined by adjusting the position of split collar 74 and rod 70, which contacts the body of cylinder 68 when rod 70 is retracted, and by adjusting the position of magnetic limit switch 100 (FIG. 1). The speed at which hydraulic cylinder 68 will retract is adjusted by adjusting the hydraulic flow in valve mechanism 102. A suggested speed is four inches per second.

The depth of cut is adjusted by rotating cam wheel 250 (FIG. 8) to the proper position for the wire size and insulation depth of the wire 26 being stripped. Flow controls may be provided on air cylinder 222 to control the rate at which blades 168 move inwardly as they contact the wire 26, and also to prevent against any hammering action. The amount of tension desired is obtained by adjusting stop 50 (FIG. 1).

The wire is then fed from tube 64 through eyelets 58, through tube 166 within blade assembly 18, past cutting tips 188, through air jet 302 and brush 310, through eyelet 108, between pulleys 94, 96 and pulley 82, through eyelets 106 and 118 and then through tube 24 to the winding machine 28.

The winding machine 28 is started, and when a specific turns count is reached as indicated by turns counter 75, motor 156 is activated and the blades 168 begin to rotate. When the counter reaches the strip count which was previously set, the flyer 39 stops, and then the signal is given by turns counter 75 to strip the wire 26. This simultaneously actuates stripper cylinder 222 causing blades 168 to pivot inwardly, tension cylinder 40 to retract thereby increasing the tension on wire 26, and wire feed cylinder 68 to retract thereby pulling a loop within wire 26, which causes the wire 26 to be pulled through rotating blades 168. At the same time, air jet 302 is activated and begins to blow the particles of insulation off the cutter tips 188 and wire 26. When wire feed cylinder 68 retracts to the preset position, limit switch 100 causes wire feed cylinder 68 to extend thereby causing pulley 82 to assume its initial position, causes tension cylinder 40 to extend so as to release the tension, causes stripper cylinder 222 to retract thereby causing blades 168 to lock radially outwardly away from wire 26, and signals the flyer 39 to begin winding the last few turns. When the flyer 39 reaches its total count, turns counter 75 will cause wire cutter 320 to retract and cut the wire, and a limit switch 322 thereon turns off motor 156 and air jet 302. If the turns counter 75 is properly set, the stripped segment of wire will be positioned in about the center of wire cutter 47, so that when the wire 26 is cut, there will be two stripped ends suitable for soldering to the lead set or other connection device. The above sequence is repeated for each set of stator windings which are formed. Of course, for many stator configurations, more than two leads will be necessary, so that more than one segment of wire will have to be stripped for every set of stator windings.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What we claim as new and desire to secure by Letters Patent o the United States is:

1. A method of stripping insulation from a continuous length of wire during a generally continous coil winding process involving a rotating flyer generating turns of wire about a coil form comprising: continuously moving insulated wire along a wire feed path from a wire supply, past a tensioning means, and developing a plurality of coils of wire in a coil winding machine by winding a continuous length of the wire drawn along the path around a coil form with the rotating flyer, counting the number of revolutions of the flyer, and providing a wire stripper device having a plurality of rotatable blades arranged in a circular array about the wire feed path between the wire supply and the winding machine; relatively moving the wire and stripper device while the wire is under tension and thereby causing the wire to be located along a straight path along the center of the circular array of blades; preselectively actuating the stripper device in response to the flyer having rotated a predetermined number of revolutions, rotating the blades, and moving the blades radially inwardly toward the wire so that the blades rotate about, engage, and strip the insulation off a segment of the wire as it and the stripper device undergo relative movement and before such segment reaches the coil form; winding wire around the coil form after the segment has been stripped, and until the segment of wire which has been stripped is located in a wire cutter; and then actuating the wire cutter to sever the wire at a point within the stripped segment.

2. The method of claim 1 wherein the coil winding machine is stopped and the wire is pulled through the stripper device independently of the winding machine while the segment of wire is being stripped, and the coil winding machine is restarted to continue winding following stripping of the segment of wire.

3. The method of claim 2 wherein the wire is manually pulled through the stripper device while the segment of wire is being stripped.

4. The method of claim 1 wherein the wire is pulled through the stripper device by the winding machine during stripping of the segment, and the winding machine is slowed down during stripping of the segment so that wire is drawn through the stripper device at a slower rate during stripping than before stripping.

5. The method of claim 4 wherein the winding machine accelerates to a higher rate of winding following stripping of the segment.

6. The method of claim 1 wherein the winding machine winds the coils at a given average rate of winding and draws the wire through the stripper device during stripping of the segment at about said average rate of winding.

7. The method of claim 1 wherein the winding machine includes a turns counter, and the method includes actuating the stripper device under the control of an electrical signal generated by the turns counter at a particular point in the coil winding process.

8. The method of claim 1 including tensioning the wire at a point between the wire supply and the stripper device.

9. A method for stripping insulation off wire during a generally continuous wind and shed coil winding process comprising: continuously moving insulated wire along a wire feed path from a wire supply by means of a flyer which rotates around a coil form and winds the wire in coils on the coil form, providing a wire stripper device in the feed path between the wire supply and the flyer so that the wire is continuously drawn through the stripper device, counting the number of times the flyer rotates around the coil form and actuating the wire stripper device to strip the insulation off a segment of wire when a predetermined flyer count is reached, continuing to cause the flyer to wind the wire on the coil form until the segment of wire which has been stripped is located in a wire cutter, and then actuating the cutter to sever the wire at a point within the stripped segment.

10. The method of claim 9 wherein the flyer draws the wire through the stripper device during stripping of the segment of wire, and the rate at which the flyer rotates about the coil form is reduced substantially during stripping of the segment of wire.

11. The method of claim 10 wherein the flyer is caused to rotate at a reduced rate when a second predetermined flyer count, earlier than the first mentioned count, is reached.

12. The method of claim 9 wherein the flyer is stopped and the wire is pulled through the stripper device independently of the flyer while the segment of wire is being stripped, and the flyer resumes rotation about the coil form following stripping of the segment of wire.

13. The method of claim 9 wherein the cutter is actuated to sever the wire when a second predetermined flyer count, later than the first mentioned count, is reached.

14. The method of claim 9 wherein: the flyer draws the wire through the stripper device during stripping of the segment of wire, the flyer is caused to rotate at a reduced rate when a second predetermined flyer count, earlier than the first mentioned count, is reached so that the flyer rotates at the reduced rate during stripping of the segment of wire, and the cutter is actuated to sever the wire when a third predetermined flyer count, later than the first mentioned count, is reached.

15. The method of claim 9 and controlling the length of the stripped segment by controlling the time during which the stripper device is actuated in relation to the linear speed of the wire during stripping.

16. Apparatus for developing coils for electric motors comprised of insulated wire and for stripping the insulation off a segment of the wire comprising:
   a supply of insulated wire,
   winding means for drawing wire from the supply and winding the wire around of coil form, said winding means comprising a flyer rotatable about the form,
   a wire stripper device positioned between the wire supply and the winding means such that the wire passes through the stripper device as it is drawn by the winding means, said stripper device being actuatable for selectively stripping the insulation off a segment of the wire,
   said winding means including a wire cutter positioned to selectively engage and cut the wire, and
   control means for actuating the stripper to strip a segment of wire after the flyer has rotated a first predetermined number of revolutions about the coil form, and for stopping the winding of the wire after a second predetermined number of revolutions, greater than the first predetermined number of revolutions, and wherein the first and second predetermined numbers are selectively determinable.

17. The apparatus of claim 16 wherein the control means causes the flyer to decelerate and rotate at a slower speed than just prior to actuating the stripper device to strip the segment of wire.

18. The apparatus of claim 16 including a wire tensioning device through which the wire passes, said tensioning device positioned between the wire supply and the stripper device.

19. The apparatus of claim 16 wherein said control means includes means for adjusting the length of the wire segment that is stripped by said stripper device.

20. The apparatus of claim 16 wherein said stripper device comprises a plurality of rotatable blades which are actuatable to engage the surface of the wire as they rotate.

* * * * *